(12) United States Patent
Netzer

(10) Patent No.: US 6,362,918 B1
(45) Date of Patent: Mar. 26, 2002

(54) COMPACT KEPLERIAN TELESCOPE

(76) Inventor: Yishay Netzer, Yuvalim, Doar Na Misgav (IL)

( * ) Notice: Subject to any disclaimer, the term of this patent is extended or adjusted under 35 U.S.C. 154(b) by 0 days.

(21) Appl. No.: 09/142,851

(22) PCT Filed: Oct. 26, 1995

(86) PCT No.: PCT/US95/13970

§ 371 Date: May 7, 1998

§ 102(e) Date: May 7, 1998

(87) PCT Pub. No.: WO96/13695

PCT Pub. Date: May 9, 1996

(30) Foreign Application Priority Data

Oct. 27, 1994 (IL) .................................................. 111427

(51) Int. Cl.⁷ .............................................. G02B 23/00
(52) U.S. Cl. ....................... 359/399; 359/431; 359/555
(58) Field of Search .................... 359/399, 403, 359/419, 420, 431, 554, 555

(56) References Cited

U.S. PATENT DOCUMENTS

| | | | | |
|---|---|---|---|---|
| 715,793 A | * | 12/1902 | Harvey | 359/431 |
| 4,867,548 A | * | 9/1989 | Andrews et al. | 359/555 |
| 4,883,347 A | * | 11/1989 | Fritzel | 359/555 |
| 5,130,855 A | * | 7/1992 | Mukai et al. | 359/836 |
| 5,321,547 A | * | 6/1994 | Zapp | 359/431 |

OTHER PUBLICATIONS

Netzer, Yishay. Line–of–Sight Steering and Stabilization. Optical Engineering, vol. 21 No. 1, Jan./Feb. 1982 pp. 96–104.*

* cited by examiner

Primary Examiner—Mark Robinson
(74) Attorney, Agent, or Firm—Mark M. Friedman

(57) ABSTRACT

A telescopic device comprises an eyepiece lens, an objective lens, a first plane mirror, a second plane mirror, and a roof reflecting mirror. The first optical axis located along the first plane mirror is parallel to the second optical axis located along the second plane mirror. The device includes a compensator for accidental image jitters comprising a pivot mechanism, an inertial sensor and a servo system for adjusting the plane mirror.

12 Claims, 3 Drawing Sheets

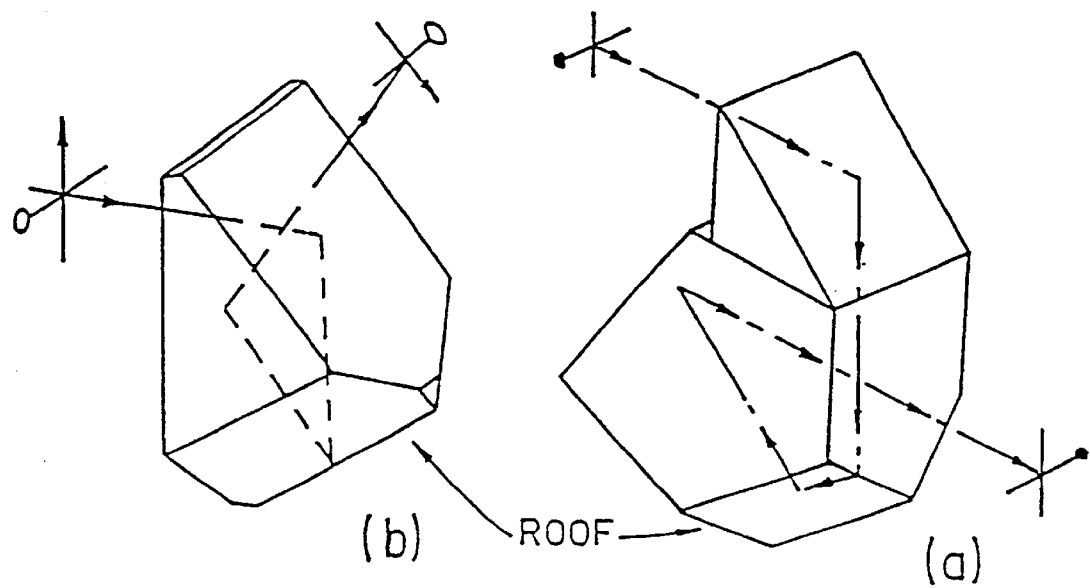
Fig. 1
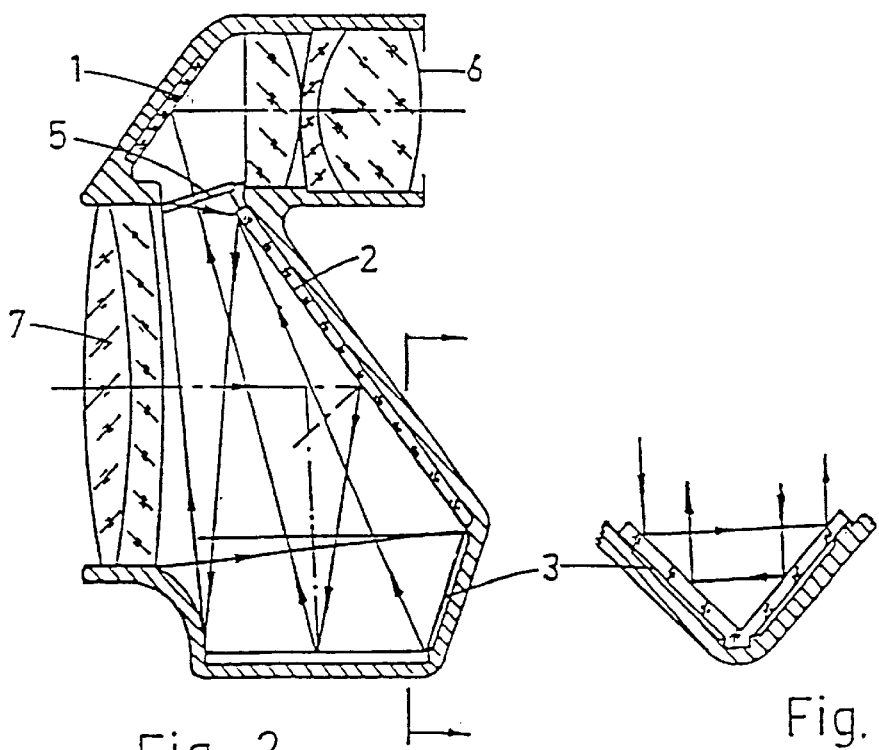
Fig. 2
Fig. 2a

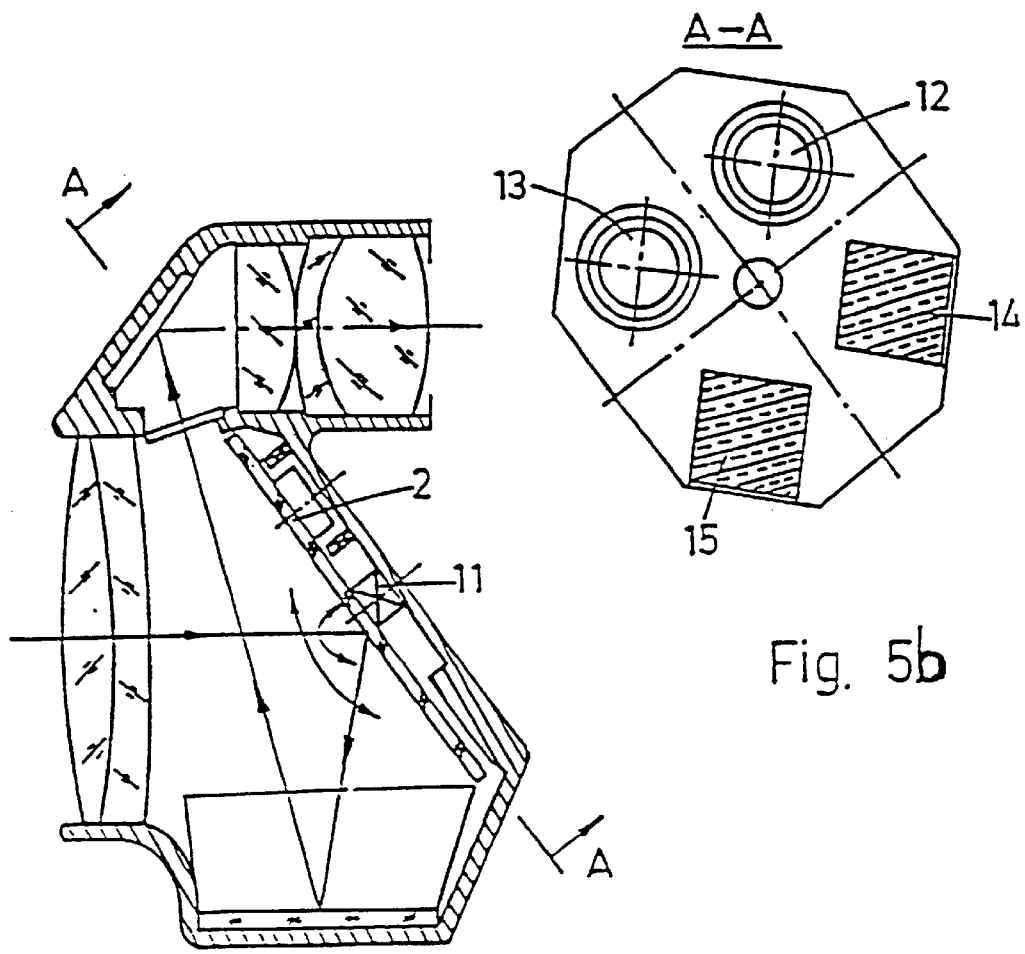
Fig. 5a
Fig. 5b
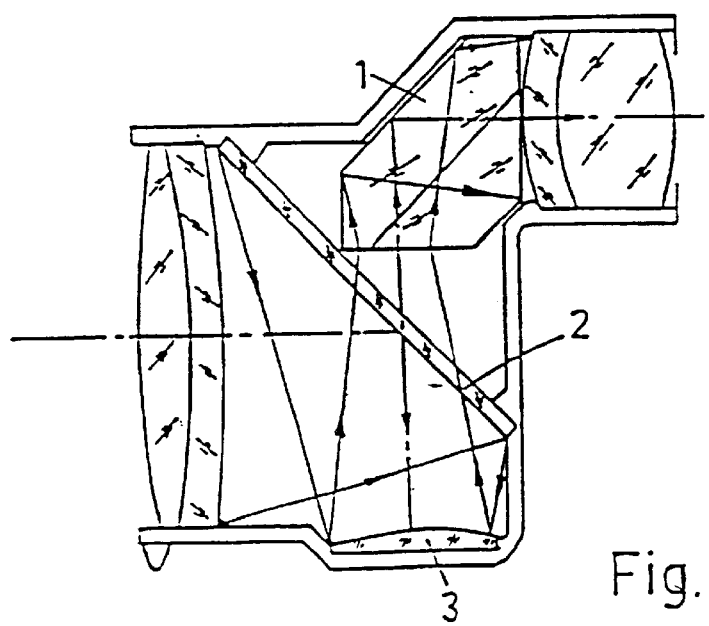
Fig. 6

COMPACT KEPLERIAN TELESCOPE

FIELD AND BACKGROUND OF THE INVENTION

The present invention relates to optical devices and means for magnifying vision, more particularly, to telescopes, binoculars, telemagnifiers (binoculars that are closely focused to, and converge at a short distance), and the like. A Keplerian telescope comprises a positive objective lens group, hereinafter referred as "the objective lens", and a positive eyepiece lens group, hereinafter referred as "the eyepiece lens". In a typical telescope the objective and eyepiece lens groups produce an inverted image which require additional means for producing an erected image. The means for erecting the image commonly comprise a system of mirrors, prisms, or combination of both. It is well known to those skilled in the art that an image erection system should include an odd number of reflections in each one of the two perpendicular axes. The most common image erection system, used in field binoculars, employs the Porro-prism system or its light-weight mirror equivalent which is described in U.S. Pat. No. 4,488,790. Both of said Porro-prism systems have no mechanical left-right symmetry, and when a symmetry is desired one of several prism systems known in the art which typically include even number of planar reflectors in the plane of symmetry, and a single roof-reflector is usually employed. Typical examples are the Hensolt prism shown in FIG. 1a, and the Schmidt prism shown in FIG. 1b. A telescope employing a Schmidt prism is described in U.S. Pat. No. 4,795,235. Such telescope is relatively compact, however, since the Schmidt prism has no hollow equivalent it is relatively heavy for a given objective lens diameter. Another major disadvantage of a telescope of this type is the fact that the eyepiece and objective lenses are mounted at a relative angle of roughly 40° between them. An additional drawback is the fact that the focal length of the objective lens is severely restricted for a given objective lens aperture, resulting in a relatively small F/# (the ratio between the focal length and the diameter of a lens). It is well known in the art that for a given set of system parameters the complexity of the optical design needed to achieve a given level of image aberration corrections is very dependent on the F/#. As a result, the number of optical elements needed for the objective and eyepiece lens groups with a small F/# is increasingly large—which impairs the compactness.

It was found that advantage can be taken of the cone shape of the light bundle emerging from a Keplerian telescope objective lens, in particular when its F/# is close to 3, by folding it in a manner analogous to that of the Hensolt prism. In contrast with the Schmidt prism that is inherently solid, relying on the total internal reflection, the present layout can be implemented by mirrors only, in order to decrease the total weight of the device. In addition, the angle between the optical axes of the eyepiece and objective lenses is optional. A Keplerian telescope including this optical structure seems to achieve the ultimate compactness possible for a given objective lens diameter, without compromising any performance parameter. This telescope may be used for compact monoculars, binoculars and, in particular, head-mounted binoculars and telemagnifiers.

It is an object of the invention to overcome the large size and relatively heavy weight limitations of the existing prior art telescopes by providing an alternative new, compact, and lightweight telescope structure.

It is another object of the invention to enable the use of the telescopes in some new applications, and to make the use of telescopes easier and more convenient in other existing applications.

It is another object of the invention to provide compactness in size and reduced weight without compromising any performance requirement.

It is another object of the invention to provide said adaptations to telescopes, monoculars, binoculars, and head-mounted telemagnifiers.

SUMMARY OF THE INVENTION

A telescopic device for magnifying image according to a preferred embodiment of the invention comprises a housing for including and supporting the optical components in suitable positioned relationship, the said housing having an eyepiece aperture and an objective aperture, and a space for including a folded optical path, an eyepiece group lens located along a first optical axis, an objective group lens located along a second optical axis, which is slightly displaced with respect to first axis, and an image erecting system comprising a first plane mirror, a second plane mirror, and a roof reflector.

A device according to a preferred embodiment of the invention has a first optical axis which is parallel to the second optical axis. According to another embodiment of the invention the device has a second optical axis which is tilted by about 20° with respect to the first optical axis in order to provide a simultaneous view of the magnified and natural view.

According to another preferred embodiment of the invention, the optical components and the device housing are made from lightweight materials, and adapted to be head-mounted.

According to any embodiment of the invention, the optical components may include diffractive elements, the eyepiece lens of the device may have a substantially rectangular shape. Further, focusing means may be provided. Said focusing means may comprise at least one laterally moving reflector. Further, the focusing means are hermetically sealed.

A still another preferred embodiment of the invention may include means for compensating for accidental image jitters comprises pivot mechanism for at least oneplane mirror, at least one angular inertial sensor mounted on the telescope envelope, and a servo system for adjusting the plane mirror according to the data received from said inertial sensor, Said servo system comprises two electromagnetic actuators, and two capacitive deflection sensing means.

BRIEF DESCRIPTION OF THE DRAWINGS

FIG. 1a depicts the Hensolt prism—typical of prior art image erection system;

FIG. 1b depicts the Schmidt prism—typical of another prior art image erection system;

FIG. 2 illustrates a cross-sectional side view of the telescope according to the invention;

FIG. 2a shows another cross-sectional view according to the invention;

FIG. 5a shows a preferred embodiment of the invention, adapted for image stabilization;

FIG. 5b shows a bottom view of mirror 2; and

FIG. 6 is an alternative preferred embodiment of the invention.

DETAILED DESCRIPTION OF THE INVENTION

Figure 3:
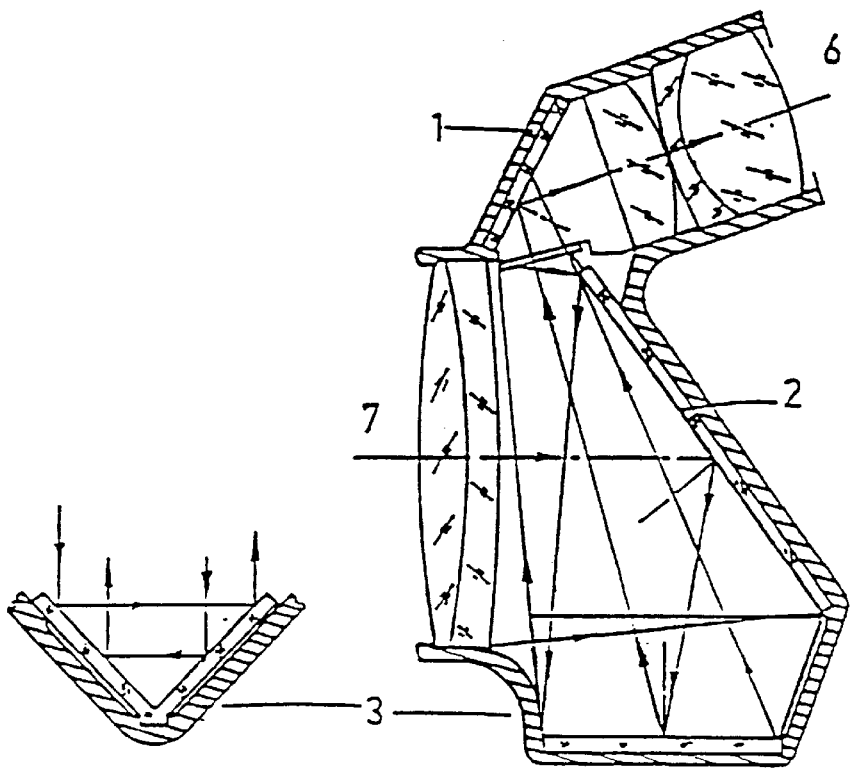
FIGS. 3 and 3a depict two cross-sectional views of a preferred embodiment of the invention having a tilted eyepiece.

FIGS. 1a and 1b illustrate the structure of two prior art erecting systems of the Hensolt prism type and the Schmidt prism type. The said prisms perform an odd number of reflections as needed, but are typically large in size, and relatively heavy.

A telescope according to a preferred embodiment of the invention is shown in FIG. 2. The telescope includes an eyepiece lens 6 an objective lens 7 and an image erection system which includes plane mirrors 1 and 2, and Roof reflector 3 shown in cross section to the right of the Figure. The image erection system provides an erect image in the image plane where the field stop aperture 5 is located. The Roof reflector 3 is a of a "hollow prism" type which includes two perpendicular plane mirrors. Elements 1 and 3 may be interchanged, if desired. It is well known to those skilled in the art that the roof reflector can be either hollow—i.e., comprise planar mirrors, or solid—wherein the reflecting planes are prism's totally reflecting surfaces. The roof refelector may also be either symmetrical Amici type—wherein the two reflecting surfaces equally share the aperture—or alternatively, comprise two successive refelecting surfaces, in the latter case it can combine one prism and one planar reflector. It is also well known that the symmetrical roof reflector is more compact but its reflecting surfaces should be very accurately perpendicular to each other, in order to elinimate double image. It is obvious that the total length of the telescope along the objective lens optical axis is very short and its volume is minimized due to exploiting the same space three times for folding the light bundle.

Figure 3A:
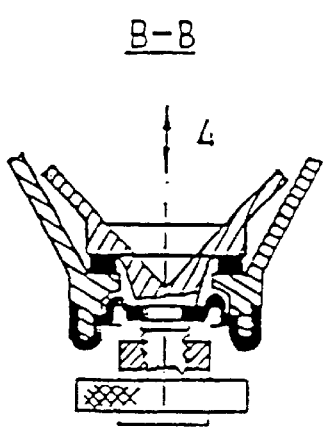

The telescope shown in FIGS. 2–2a has conventional parallel optical axes for the objective and eyepiece lenses. In FIGS. 3–3a another embodiment of the invention is shown, in which the optical axis of the eyepiece lens is tilted relative to the optical axis of the objective lens in order to eliminate obscuration of the natural image by the magnified image as described in an Israeli patent application number 111429 filed Oct. 27, 1994 by the same applicant herein, the specification of which incorporated herein by reference.

The telescope of the invention can employ conventional glass elements but, in weight sensitive applications, like spectacle-frame mounted binoculars, plastic lenses which are typically lighter by a factor of two are preferable. To reduce weight even further hybrid refractive-diffractive optics as described in Thomas W. Stone, "Hybrid diffractive-refractive telescope", SPIE Vol. 1212 Practical Holography IV (1990), pp. 257–266 may be used. In this technology the color correction of the lenses is obtained with no recourse to achromatic doublets and therefore with thinner lenses. For example, when adapting glass optical elements in a monocular telescope according to the invention which has a power of X6 and objective lens diameter of 25 mm the total weight of the device is approximately 50 g. When the glass elements are replaced with plastic elements the weight drops to approximately 30 g, and with plastic refractive-diffractive elements the weight drops down to 20 g, which is approximately the weight of a single glass prescription lens.

The field of view of a Keplerian telescope is determined by the field stop aperture 5 at the image plane which is conventionally circular. It was found that for nearly all practical applications the telescope according to the invention gains several advantages if the field-of-view has a landscape rectangular shape rather than a round one:

1—the horizontal extent of field-of-view is usually more important than of the vertical extent;

2—the aesthetic appeal of the magnified view is higher;

3—the total length of the telescope is even shorter;

4—if the contour of the eyepiece is made to conform to the magnified field-of-view, the natural field-of-view obscured by the eyepiece is minimized. This is significant when the eyepiece optical axis is tilted as shown in the device of FIGS. 3–3a.

Figure 4A:
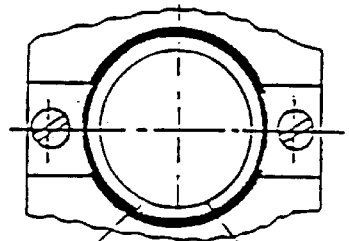
FIG. 4a shows two cross-sections of a possible focusing mechanism for the preferred embodiment of the invention of FIG. 3.
Figure 4B:
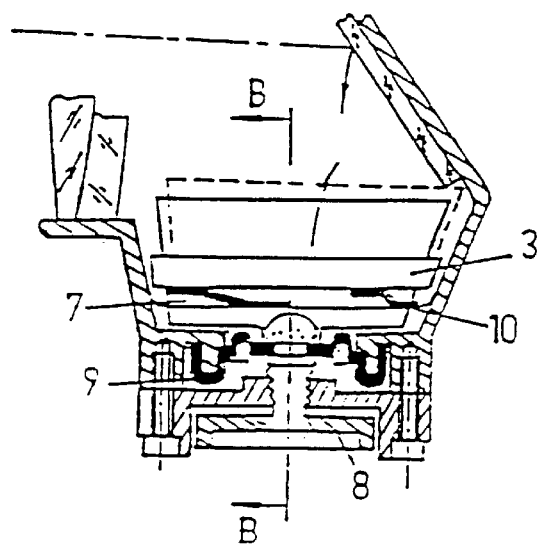
FIG. 4b depicts a partial bottom view of the focusing mechanism.

The telescope according to the invention may be typically focused by displacing the eyepiece lens assembly 6 or part of it along its optical axis by a thread mechanism. For a rectangular eyepiece, an alternative mechanism is desirable. A Preferred focusing mechanism is based on displacing reflector 3 as shown in FIGS. 4–4a along axis 4 that bisects its roof angle, and which is perpendicular to its vertex line at the midpoint. A translation by f of the reflector 3 would axially shift the image plane by nearly 2 f, however, since axis 4 is not parallel to the optical axis, an undesirable lateral image shift would also result. Such shift can be compensated by an angular translation component imparted to reflector 3. The complex motion needed could, in principle, be obtained by mounting reflector 3 on a pivot axis which is impractically located external to the telescope envelope. The pivot can, however, be simulated within the telescope envelope as shown in FIGS. 4–4a–4b where the focusing reflector 3 rests on a resilient mount implemented by two leaf-spring pairs 7 and 10 which are properly chosen to have different spring rates. Consequently, when a force is applied at the center of the reflector along axis 4 the two springs yield differently, resulting in a combined angular and linear displacement. In the preferred embodiment of the invention the force is applied by means of a threaded knob 8 through a flexible sealing membrane 9. This type of focusing mechanism is insensitive to lateral tilt of the hollow roof which may result from tolerances in the leaf spring rates since the roof reflector is known to reflect light independent of a tilt in the cross-axis.

In still another embodiment of the invention, depicted in FIGS. 5a–5b, a mirror 2 is mounted on a two-axis pivot mechanism 11 that is located close to the center of the reflecting plane. The angular position of mirror 2 relative to the telescope housing is controlled by command signals that are derived from two angular inertial sensors (not shown) such as solid state rate gyroscopes that are fixed to the telescope housing. Said inertial sensors sense any accidental angular motion of the telescope relative to the inertial line-of-sight and in conjunction with electromagnetic actuators 12 and 13 and capacitive deflection sensing means 14 and 15 constitute a two-axis position-servo system that controls the mirror deflection in a manner that compensates for accidental image jitters that would otherwise result. Further elaboration may be found in Yishay Netzer, "Line of sight steering and stabilization", Optical Engineering, January/February 1982, pp. 96–104.

When the telescope is employed in a stereoscopic head-mounted magnifier, such as in medical applications and the eyepiece is tilted as in FIG. 3 it was found that an image rotation is induced in each one of the individual images which make their fusion difficult and strain the observer. The reason of the image rotation was traced to the combined effect of the tilting angle of the eyepieces optical axes and the convergence angle of the objective's optical axes. A corrective image rotation may be achieved by rotating the roof-reflector 3 about axis 4 in FIG. 3 where a mechanical rotation by an angle ½ induces an image rotation by an angle whose magnitude and sense are selected in accordance with the desired compensation.

FIG. 6 depicts a modification of the optical layout of FIG. 2 where reflector 1 is replaced with a solid roof prism, reflector 2 has an opening and the optical axis is perpendicular to reflector 3. This perpendicularity enables reflector 3 to be made convex, as shown, and serve as a Barlow element.

The opening in mirror 2 of FIG. 6 is effectively an obscuration to the aperture of its entrance aperture (the objective lens). This obscuration is imaged by the telescope onto its exit pupil and could pose a problem if its image extends a significant portion of the exit pupil area. However, since the opening is located close to the image plane where the cross-section of the light bundle is minimal, its extent is minimum. A basic manipulation in geometrical optics reveals that in the above premise, the diameter of the obscuration at the exit-pupil roughly equals 2 F where F and are, respectively, the eyepiece focal-length, and the telescope field of view. The obscuration is thus relatively small and, since essentially the observer pupil is positioned at the telescope exit pupil, it is barely noticeable.

An extremely compact telescope is thus provided that is ideally adaptable to hand-held and spectacle-mounted binoculars as well as monoculars.

What is claimed is:

1. A telescopic device for magnifying an image comprising:
   a housing having an eyepiece aperture and an objective aperture, and a space for including a folded optical path;
   an eyepiece group lens associated with said eyepiece aperture and located along a first optical axis;
   an objective group lens associated with said objective aperture and located along a second optical axis, which is slightly displaced with respect to first axis, said objective group lens having a focal length greater than a focal length of said eyepiece group for forming a magnifying optical system; and
   an image erecting system including a first reflective element, a second reflective element and a third reflective element deployed within said housing so as to define a folded converging light bundle from said objective group lens to said eyepiece group lens, wherein one of said first, second and third reflective elements is a roof reflector and at least one other of said first, second and third reflective elements is a plane mirror, said first, second and third reflective elements being deployed such that said light bundle travels through at least one part of said space in three different directions, said image erecting system approximating to an at least partially hollow implementation of a Hensolt prism.

2. A device according to claim 1 wherein the first optical axis is parallel to the second optical axis.

3. A device according to claim 1 wherein the second optical axis is tilted with respect to the first optical axis in order to provide a simultaneous view of the magnified and natural view.

4. A device according to claim 1, wherein the optical components and the device housing are made from light-weight materials, and adapted to be head-mounted.

5. A device according to claim 1 wherein the optical components include diffractive elements.

6. A device according to claim 1, wherein at least the eyepiece lens has substantially a rectangular shape.

7. A device according to claim 1, further provided with focusing means.

8. A device according to claim 7 wherein, the focusing means comprise at least one laterally moving reflector.

9. A device according to claim 8, wherein the focusing means are hermetically sealed.

10. A device according to claim 1, further comprising means for compensating for accidental image jitters.

11. A device according to claim 10 wherein the means for compensating for image jitters comprise:
    pivot mechanism for at least one plane mirror;
    at least one angular inertial sensor mounted on said housing; and
    a servo system for adjusting the plane mirror according to the data received from said inertial sensor.

12. A device according to claim 11 wherein the servo system comprises:
    two electromagnetic actuators; and
    two capacitive deflection sensing means.

* * * * *